United States Patent [19]

Radov

[11] Patent Number: 4,894,674
[45] Date of Patent: Jan. 16, 1990

[54] DAYLIGHT BULK FILM LOADING SYSTEM

[76] Inventor: Mitchell C. Radov, 631 Montroyale Dr. E., Erie, Pa. 16504

[21] Appl. No.: 247,627

[22] Filed: Sep. 22, 1988

[51] Int. Cl.$^4$ .............................................. G03B 17/26
[52] U.S. Cl. .................................. 354/275; 354/354;
242/71.7; 242/56 R; 242/58
[58] Field of Search ............. 354/275, 354; 242/56 R,
242/58, 71.1, 71.2, 71.7

[56] References Cited

U.S. PATENT DOCUMENTS

| | | | |
|---|---|---|---|
| 1,460,435 | 7/1923 | Newman | 242/71.7 |
| 2,219,722 | 10/1940 | Lloyd | 242/71.7 |
| 2,239,188 | 4/1941 | Boes | 242/71.7 |
| 2,298,339 | 10/1942 | Boes | 242/71.7 |
| 3,586,258 | 6/1971 | Horlezeder | 242/71.7 X |
| 3,612,424 | 10/1971 | Friedel | 242/71.1 |
| 3,768,748 | 10/1983 | Pfefer | 242/71.7 |
| 3,871,596 | 3/1975 | Morgan | 242/71.2 |
| 3,929,035 | 8/1974 | Backscheider | 242/71.7 |
| 4,116,398 | 9/1978 | Roberts | 242/56 R |
| 4,272,035 | 6/1981 | Sherman | 242/71.7 X |
| 4,527,320 | 7/1985 | Deconinck | 242/71.7 X |

FOREIGN PATENT DOCUMENTS

| | | |
|---|---|---|
| 500572 | 9/1936 | Fed. Rep. of Germany . |
| 430080 | 12/1948 | Italy ................... 242/71.7 |
| 2077225 | 12/1981 | United Kingdom . |

Primary Examiner—L. T. Hix
Assistant Examiner—Brian W. Brown
Attorney, Agent, or Firm—Howson and Howson

[57] ABSTRACT

A bulk film loader for use in daylight conditions including a light-tight casing for receiving cartridges of film in strip form. The film for a desired number of exposures is transferred from a cartridge onto a camera film feed spool or cassette. A guillotine extending into the casing cuts the film. For certain films, the loader also includes a roll of opaque leader strips in a separate cartridge. The strips are separable into individual leaders which can be attached to the opposite ends of a measure quantity of film.

42 Claims, 7 Drawing Sheets

DAYLIGHT BULK FILM LOADING SYSTEM

BACKGROUND OF THE INVENTION

The present invention relates to supports and holders for reeling and unreeling strip material, and more particularly to apparatus for loading bulk photographic strip film from cartridges onto camera film feed spools or cassettes in daylight conditions.

The economic advantages of purchasing photographic strip film in bulk quantities are obvious, especially to professional and serious amateur photographers. In current systems, the bulk film of one selected type or format is placed on a reel within a loader under complete darkroom conditions and then dispensed in measured quantities on camera feed spools. Once placed in the loader, the film cannot be removed without exposure except by returning to a darkroom or using a changing bag. Therefore, the photographer usually carries a bulk loader for each type of film, e. g. size, ASA rating, color or black-and-white, he or she anticipates using. As more bulk film loaders are needed to meet a variety of film types, the savings in buying bulk quantities become offset and frequently exceeded by the large inventory of loaders required. Even if only one type of bulk film were used conventional loaders are not suitable for travelers passing through government custom inspections. A routine search usually will require the bulk film loader to be opened in daylight thus exposing all of the film contained within.

Most bulk film loaders have been designed for the ubiquitous 35 mm camera. However, cameras using medium format film, such as 6×4.5, 6×6, 6×7 and 6×8 cm, are popular among the professionals and serious amateurs because they give the photographer negatives about two and one-half times the size of 35 mm negatives. Therefore the negatives are much sharper especially when enlarged into prints beyond the 8×10 inch size, and they usually afford better color fidelity. The 6×4.5-cm format in particular, offers substantially no loss of negative due to cropping when enlarged to an 8×10-inch print because the ratios of width to length are nearly equal. Medium format cameras have also become as versatile as high quality 35 mm cameras to the extent they also include the more recent features such as programmed metering and automatic winding.

Consequently, as more medium format cameras come into use there is an increasing demand for a bulk loading film system for medium format film. Heretofore, medium format film has not been amenable to bulk loading because they require leaders at the beginning and end of the film strip, and the entire film strip between leaders must be processed even if only a small segment of frames have been exposed. Large quantities of unexposed film is therefore wasted in processing strip film of lengths determined by the manufacturers. There is currently no simple bulk film loader capable of allowing the photographer to minimize film waste by choosing film strip lengths with leaders of the exact length needed for exposure and processing. Furthermore, due to the excessive length of film between leaders provided by film manufacturers, circular, submersible spool-type development tanks are required. This is because the film lengths preclude the use of short rectangular tanks with their attendant savings in process chemicals.

SUMMARY OF THE INVENTION

Accordingly, it is an object of the present invention to provide a photographic bulk film loader which will enable serious amateur and professional photographers to load a camera film feed spool or cassette from one of many different types of film under daylight conditions.

Another object is to provide a bulk film loading system in which light-tight bulk film cartridges of different types of film can be conveniently substituted in a single bulk loader in daylight such as at the photography site, and which will give the photographer greater flexibility to choose the desired film type to be loaded on a camera film feed spool or cassette.

Another object of the invention is to provide a bulk film loader in which the number of exposures for a length of various size strip films transferred to a camera spool or cassette are automatically measured and indicated.

Still another object is to provide a bulk film loader suitable for splicing leaders to the ends of medium format strip film during the loading process under daylight conditions; and which requires no additional tools or materials for splicing leaders to the wound film.

A further object of the invention is to provide a leader supply for attaching to the ends of medium format strip film in a bulk film loader.

A still further object is to provide a bulk film loader and leader supply which are inexpensive to fabricate and simple to use under complete daylight conditions.

Briefly, these and other objects of the invention are accomplished with a bulk film loading system comprising a light-tight casing formed to receive rolls of bulk strip film contained in light-sealed cartridges. The film is transferred within the casing from a cartridge onto a camera film feed spool or cassette in a desired number of exposures as measured by an electronic counter with digital readout. A manually operated guillotine-type blade extending into the casing cuts the film at the desired quantity. For medium format film, the loader also houses a separate cartridge which dispenses a strip of leaders for splicing to either end of a measure length of the film. The leader cartridge contains a roll of opaque strips joined end-to-end by transverse adhesive tapes. Each tape is severable between adjacent strips, and each strip is severable intermediate their ends to form individual leaders with tapered ends for threading into the camera film feed and camera take-up spools, respectively. In other embodiments, the loader is simplified for use with one or two bulk film cartridges of strip film of the type requiring no leaders.

Other objects, novel features and advantages of the invention will become more apparent from the following detailed description when considered in conjunction with the accompanying drawings wherein: dr

DESCRIPTION OF THE PREFERRED EMBODIMENTS

Figure 1:
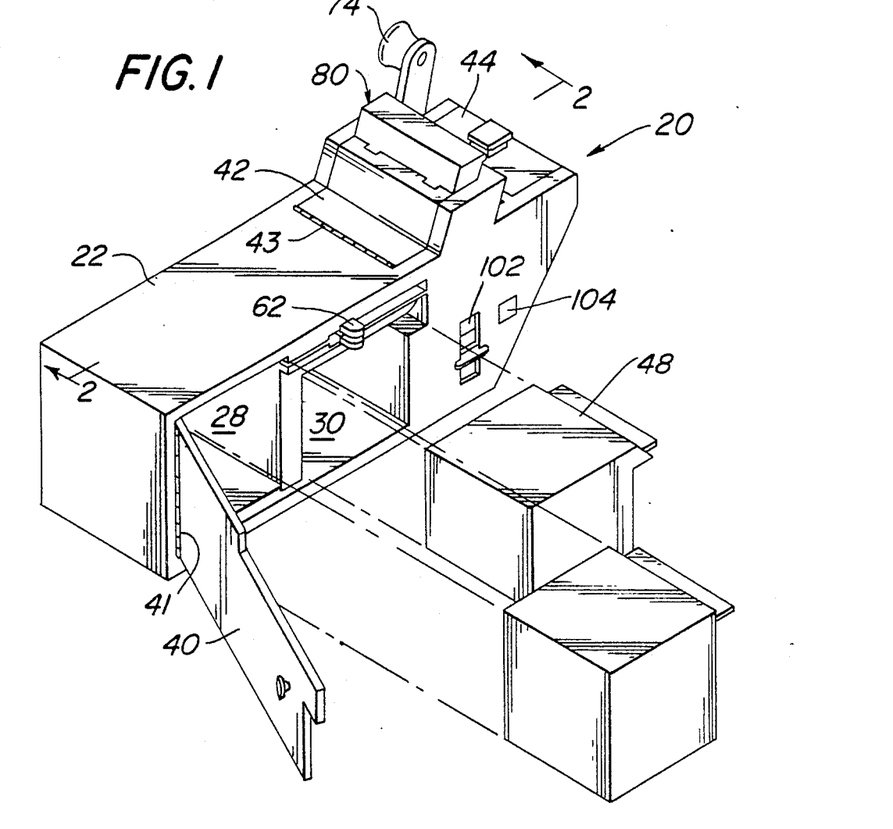
FIG. 1 is an isometric view of one embodiment of a bulk film loader with a compartment door open and film and leader cartridges positioned for insertion.
Figures 2, 4, 10:
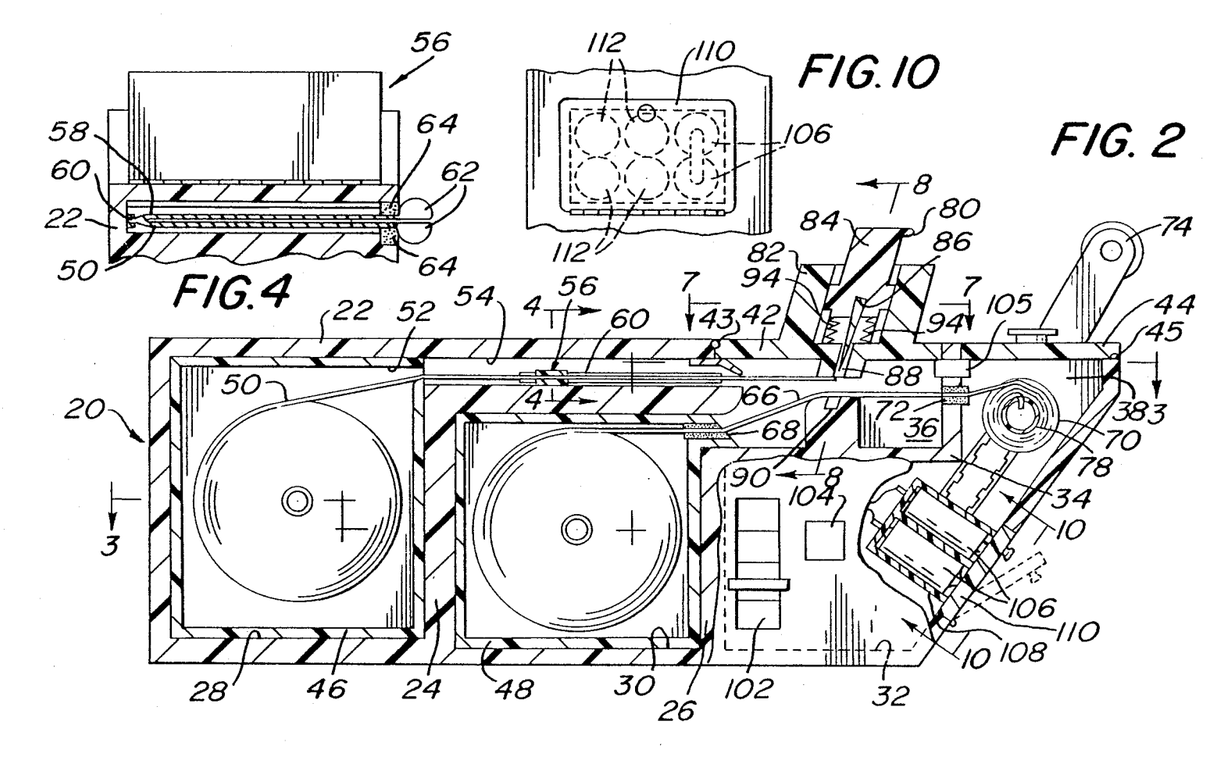
FIG. 2 is a vertical cross section of the loader taken along the line 2—2 of FIG. 1.
FIG. 4 is a vertical cross section of a leader transport mechanism in the loader taken along the line 4—4 of FIG. 2.
FIG. 10 is a frontal view of a battery compartment within the loader taken along the line 10—10 of FIG. 2.
Figure 3:
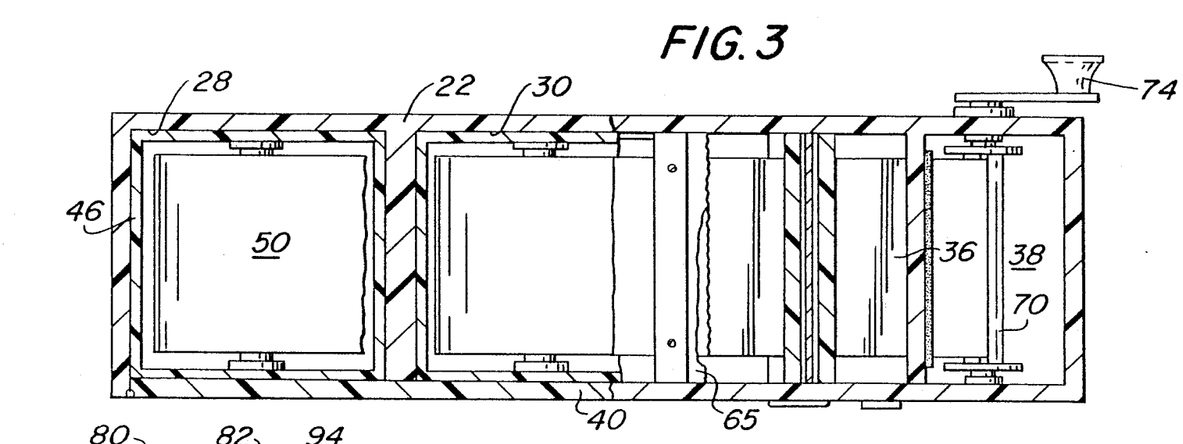
FIG. 3 is a horizontal cross section of the loader taken along the line 3—3 of FIG. 2.

Referring now to FIGS. 1-3 of the drawings wherein like characters designate like or corresponding parts throughout the several views, there is shown a bulk film loader 20 comprising a generally elongated rectangular casing 22, preferably of a light alloy or plastic, partitioned by dividers 24 and 26 into an in-line series of three compartments designated as leader compartment 28, bulk film compartment 30 and loading compartment 32, respectively. Compartment 32 is further partitioned by divider 34 into a splicing chamber 36 and a spool chamber 38. A single door 40 along one side of casing 22 opens about a hinge 41 providing access into compartments 28 and 30. Doors 42 and 44 on the top of casing 22 open about hinges 43 and 45 providing access to chambers 36 and 38, respectively.

Leader and bulk film compartments 28 and 30 are formed to interface slidably through the opening at door 40 with rectangular leader and bulk film cartridges 46 and 48 containing rolls of opaque leader strips 50 and photosensitive strip film 66, respectively. When cartridges 46 and 48 are fully inserted in their respective compartments, the strips and film unroll about parallel axes normal to the length of casing 22. The rectangular configuration of the cartridges prevent them from rotating within casing 22 as the strips and film unroll. The cartridges are preferably made of low cost materials such as plastic or cardboard which may be discarded when its contents have been expended. Leader strips 50 are dispensed from a slot 52 along one edge of cartridge 46 into a passageway 54 along the top of casing 22 and then fed by a slidable leader transport 56 into splicing chamber 36.

As best seen in FIG. 4, leader transport 56 includes a bifurcated spring 58 with the joined ends slidable along passageway 54 in a track 60 fixed along the side of casing 22 opposite of door 40, and the distal ends slidable between resilient light-tight gaskets 64, such as of felt, rubber or plastic foam, secured to either side of passageway 54 above door 40. The bifurcated members of spring 58 extend across leaders 50 and terminate in finger grips 62 extending from the side of casing 22. When grips 62 are squeezed together and then slid forward, any leader strip 50 between the members of spring 58 is advanced beneath a serrated cutting edge 65 toward the splicing chamber 36.

Figure 5:
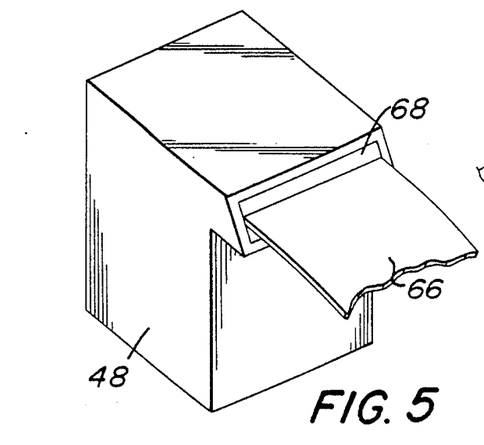
FIG. 5 is another isometric view of the film cartridge from its dispensing side.
Figure 6:
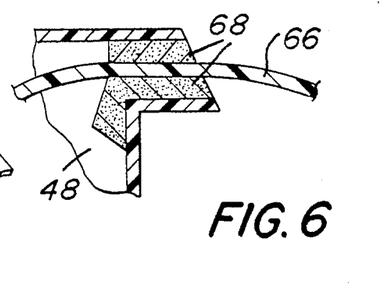
FIG. 6 is a cross section of a portion of the film cartridge taken along the line 6—6 of FIG. 5.

Strip film 66 is dispensed from a slot 68 (FIGS. 5 and 6) along one edge of cartridge 48 adjacent to passageway 54 into chamber 36. In accordance with a splicing and loading procedure described hereinbelow, either leader strips 50 or strip film 66 passes from splicing chamber 36 through a slot 72 in divider 34 to a reloadable camera film feed cassette or spool 70 in spool chamber 38. Slots 68 and 72 include light-tight gaskets of felt, resilient plastic foam or the like to prevent possible film exposure when splicing chamber door 42 is opened.

Door 44 provides access into spool chamber 38 for inserting and removing spool 70 and for threading leader strips 50 or film 66 in a slotted spindle 78 (FIG. 14) of spool 70. A drive means such as a hand crank 74 is formed to removably engage spool 70 on an axis parallel to the leader and film roll axes for winding strip film 66 in a desired amount.

Figure 7:
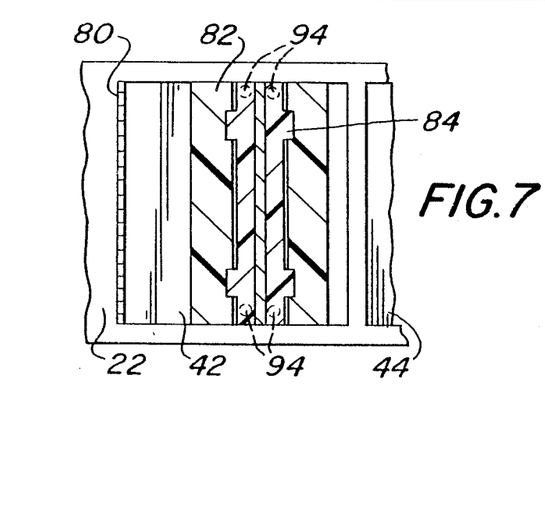
FIG. 7 is a horizontal cross section of a splicing chamber door and cutter in the loader taken along the line 7—7 of FIG. 2.
Figure 8:
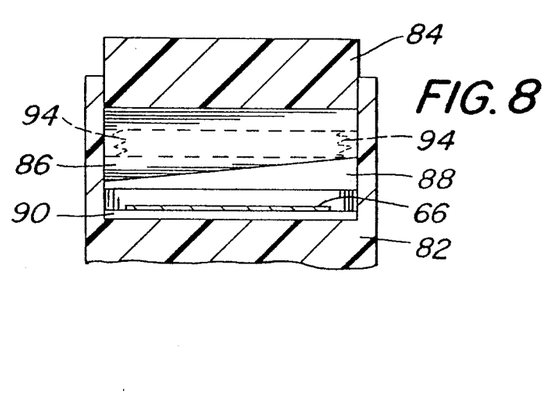
FIG. 8 is an oblique cross section of the cutter taken along the line 8—8 of FIG. 2.

Door 42 provides access to splicing chamber 36 for joining leader strips 50 to the ends of film 66 after it has been cut by a guillotine 80 in door 42. A blade 86, attached to a plunger 84 and slidable in a boss 82 of door 42, is guided through a transverse slot 88 into registration with a notch 90 in divider 34. Any leader strip or film present under blade 86 will be cut on a line above groove 90 when plunger 84 is urged downwardly. As best seen in FIGS. 7 and 8, blade 86 is transversely inclined to progressively move the cutting edge across film 66 as blade 86 moves downwardly. Springs 94 disposed between door 42 and plunger 84 bias blade 86 out of contact with any leader strips 50 or strip film 66 over notch 90.

Bulk film loader 20 of FIG. 1 may be used with a variety of types of photographic film, however certain films, such as 35 mm, require no leaders. In such cases, the film in cartridge 48 would merely pass through splicing chamber 36 to spool 70 with guillotine 80 being used only to cut the measured quantity.

Figure 9:
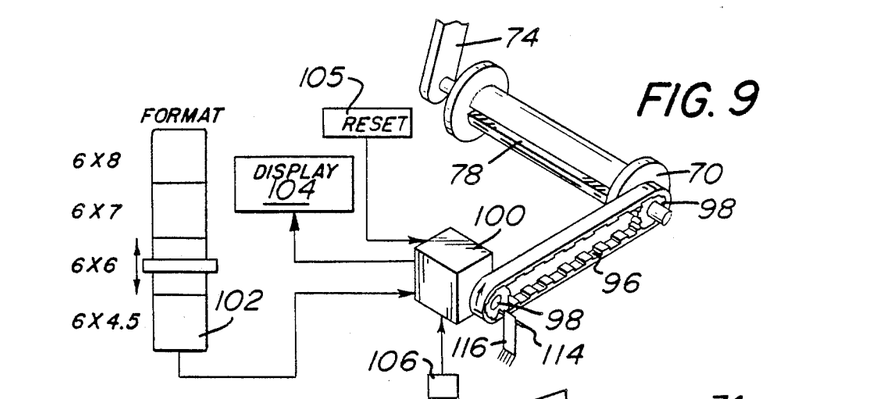
FIG. 9 is a block diagram of an electronic counter and display system connected to a crank mechanism within the loader of FIG. 1.

The number of exposures of film transferred to spool 70 is approximated with rotation of crank 74 and film format size. Referring to FIG. 9, crank 74 is connected through spool 70, a toothed belt 96 and sprockets 98 to an electronic digital computer 100 which multiplies the number of sprocket revolutions by a multiplier signal from a film format selector 102. Obviously the amount of film transported per revolution progressively increases as it accumulates on spool 70 because each added layer of film increases the outer diameter of the rolled film. Consequently, its circumference also increases such that each revolution takes on more film than the preceding revolution. However the discrepancy is slight and in favor of an adequate supply. More sophisticated but costlier exposure counters, which compensate for the progressively increasing circumference at the rolled film on spool 70, are contemplated if more accurate measurement is needed. In the illustrated embodiment, format selector 102 stores multiplier signals for 6×8, 6×7, 6×6 and 6×4.5 cm medium format films, the width in each format being 6 cm. The number of exposures or frames per revolution of the crank 74 is established for one format size, and the multiplier for other film sizes determined. For example, if the output of computer 100 at display 104 indicates one frame of 6×8 cm format per revolution of sprocket 98, a 6×4.5 cm format will require a multiplier signal from selector 102 of 8/4.5 or 1.78. That is, each complete turn of crank 74 will transport 1.78 frames of 6×4.5 cm format. A 35 mm film format will require a multiplier signal of 8/4.35 or 1.84, where 4.35 cm is the length allowed for each exposure to yield seven frames per foot.

The output of computer 100 representing the number of exposures at any instant is visually indicated at a digital readout display 104. A counter reset switch 105 electrically connected to computer 100 and mechanically actuated upon closure of both spool chamber doors 42 and 44 commands computer 100 to commence counting. Opening splicing chamber door 42 resets the computer count to return the indicia in display 104 to zero.

Computer 100 and the peripheral electrical components are conventional and energized by batteries 106, preferably two series-connected 1.5 volt AA-size alkaline cells, retained in a holder 108 (FIG. 2) within chamber 38 by an access door 110 hinged to the forward end of casing 22. Compartment 108 is configured to hold four spare batteries 112 (FIG. 10); however, in the event of complete battery failure, a pin 114 (FIG. 9) extending from one of the sprockets 98 momentarily deflects a cantilevered leaf spring 116 fixed to a casing 22 to produce an audible "click". In the example, one complete frame of 6×8 cm format or 1.78 frames of 6×4.5 cm format will be transported between "clicks". Ten "clicks" of 35 mm film will transport approximately 10×1.84 or 18.4 exposures of 35 mm film.

Figures 11, 12:
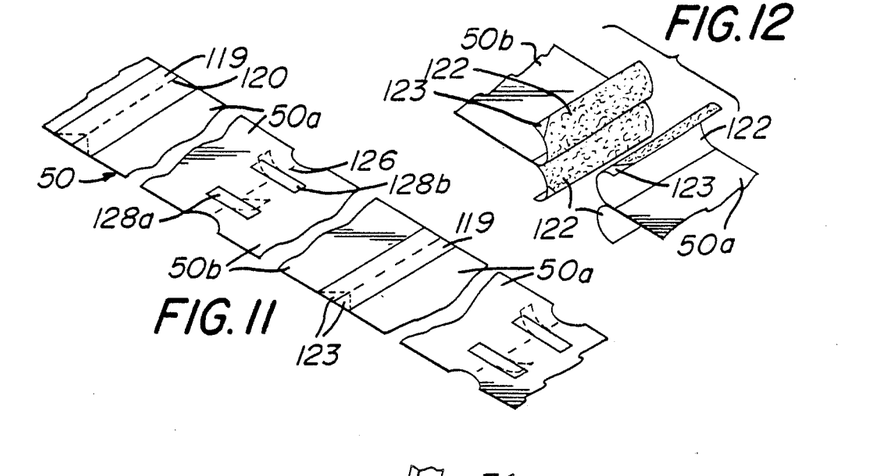
FIG. 11 is a fragmented view of a laid out portion of a roll of leader strips within the leader cartridge of FIG. 1.
FIG. 12 is an isometric view of adhesive leaves of a splicing tape between adjacent leader strips separated for engaging the opposite ends of a strip film drawn from the film cartridge of FIG. 1.

Unlike 35 mm film, medium format film requires a leader at one end for feeding into the camera film feed spool, and an opaque wrapper at the other end to avoid exposure to light. Referring to FIG. 11, a plurality of opaque leader strips 50, preferably of paper, are arranged end-to-end and joined by adhesive-coated tapes 119 secured across the ends. A line 120 marked along the middle of each tape 119 provides a visual guide for cutting or tearing strips 50 at the prescribed length. Tape 119 may also be perforated on a cross line 120 to enable it to be separated in two entirely by hand or by pulling it upward against the cutting edge 65 above track 60. As best illustrated in FIG. 12, where a tape 119 is shown separated along line 120, the portions on either side form leaves 122 contiguously joined together by a peelable "stick-on" adhesive. Corners 123 are free of adhesive for convenient access to pull leaves 122 apart for splicing to film ends. Between the ends of each leader strip 50 is a crosswise perforation 126 for separating strip 50 into a feed spool leader 50a and a take-up spool leader 50b. The ends of leaders 50a and 50b are tapered in toward perforations 126 for insertion into the slotted spindle 78 of camera film feed spool 70 or into a camera take-up spool, not shown. A pair of tabs 128a and 128b, each affixed to and extending from respective ends of leaders 50a and 50b at perforation 126 and coated with an adhesive. Tab 128b is positioned on leader 50b for sealing the outer end thereof around the unexposed roll of film after it has been removed from the bulk loader to protect it from light exposure prior to camera loading and to effect safe and convenient film storage. Tab 128a is positioned on leader 50a to seal the outer end thereof around the camera-exposed roll of film before it is processed.

Figure 13A:
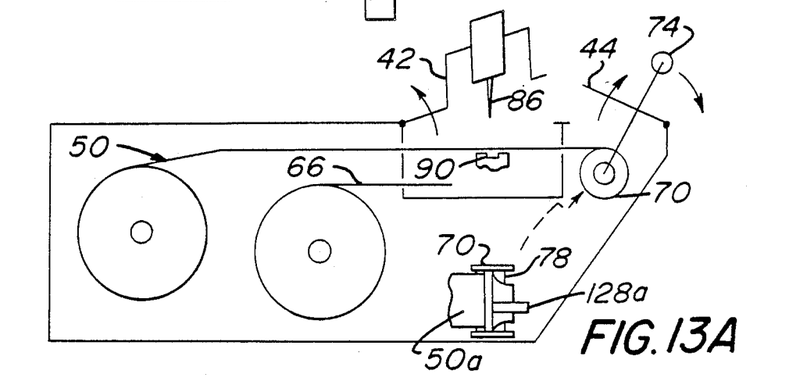
FIG. 13A-13G schematically illustrate the sequence for transferring and splicing bulk medium format film and leaders from their respective cartridges to a camera film feed spool or cassette.
Figure 13B:
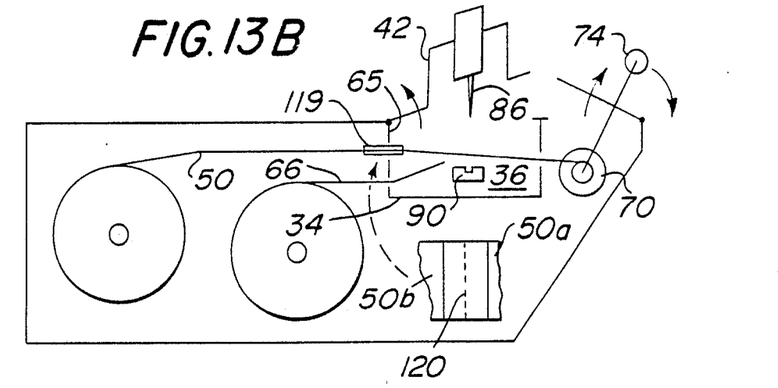
Figure 13C:
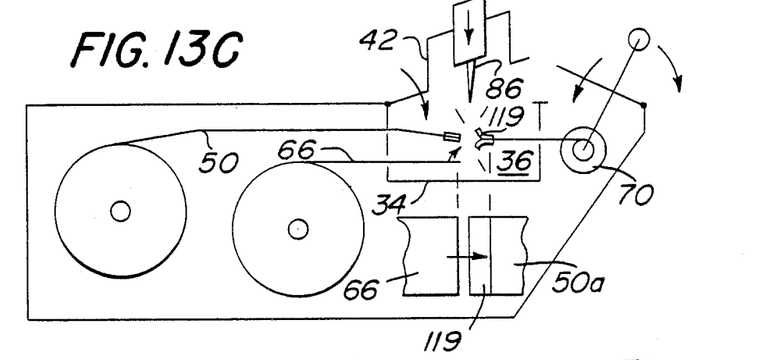
Figure 13D:
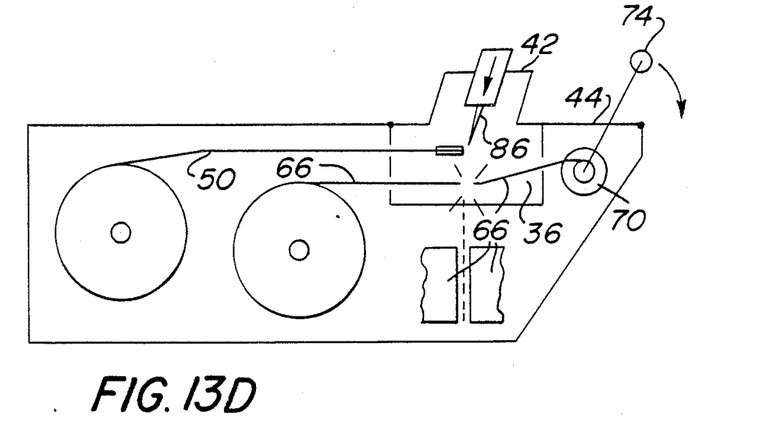
Figure 13E:
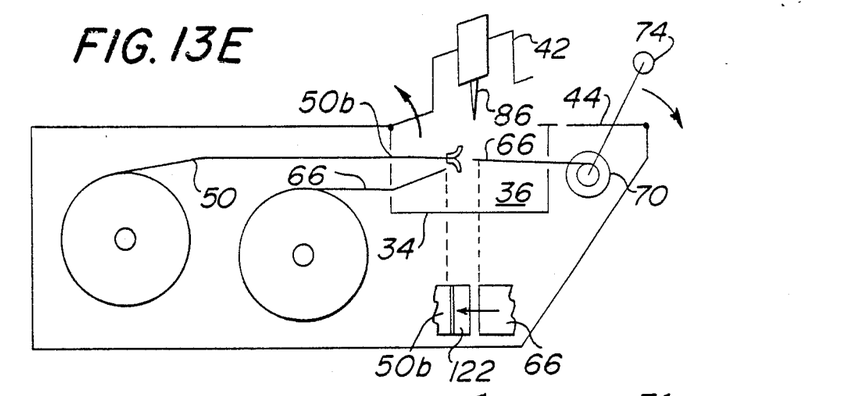
Figure 13F:
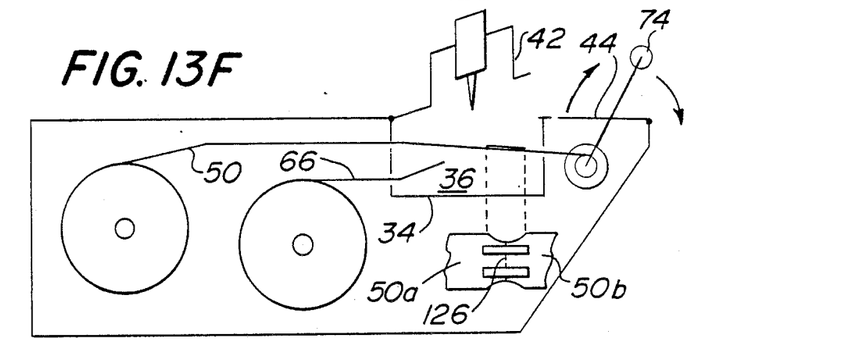
Figure 13G:
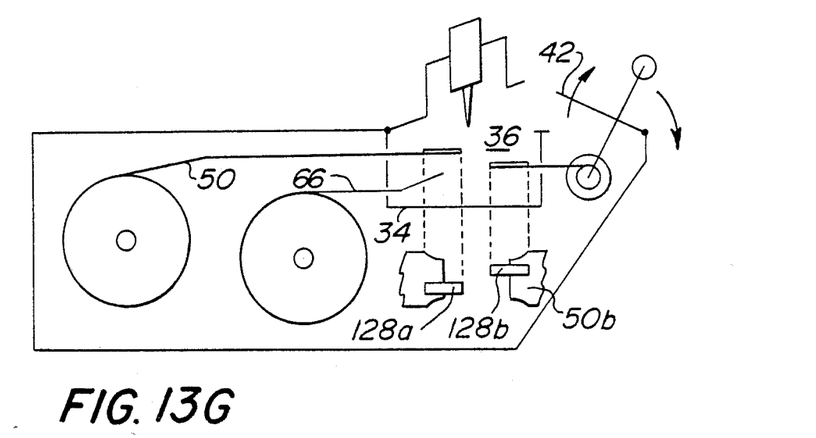

Operation and use of the above-described bulk film loader will now be summarized with reference to the sequential schematic illustrations of FIGS. 13A–13G. With leader and film cartridges 46 and 48 placed in closed compartments 28 and 30, the end of the first feed spool leader 50a extending from slot 52 of leader cartridge 46 is drawn by transport mechanism 56 through passage 54 into splicing chamber 36. In FIG. 13A, chamber doors 42 and 44 are open to allow the leading end of leader 50a with tab 128a to be threaded through light-tight slot 72 and about spool 70. Crank 74 is turned until line 120 on tape 119 registers with cutting edge 65 as shown in FIG. 13B, and leader 50a is pulled upward to allow edge 65 to separate it from leader 50b. In FIG. 13C, the end of film 66 extending from slot 68 of film cartridge 48 is adhesively spliced between the separated leaves 122 of the trailing end of feed spool leader 50a. Door 42 being opened caused switch 105 to reset the count at display 104 to zero. With the desired format set at selector 102 (FIG. 2), both doors 42 and 44 are now closed to activate computer 100 and begin counting frames. Crank 74 is turned until display 104 indicates the desired number of frames or exposures have been wound on spool 70, after which blade 86 is pressed down to cut film 66, as shown in FIG. 13D. Splicing chamber door 42 is then opened (FIG. 13E), resetting the count to zero, to enable take-up spool leader 50b to be adhesively spliced to film 66 by leaves 122 of tape 119. In FIG. 13F, crank 74 has been turned until tape 119 on the next leader strip 50a is within splicing chamber 36 where it can be separated at perforation 126. At this stage, spool chamber door 44 may also be opened (FIG. 13G) to remove spool 70 and to secure tab 128b around the outside end of the rolled up film and leader.

Figure 14:
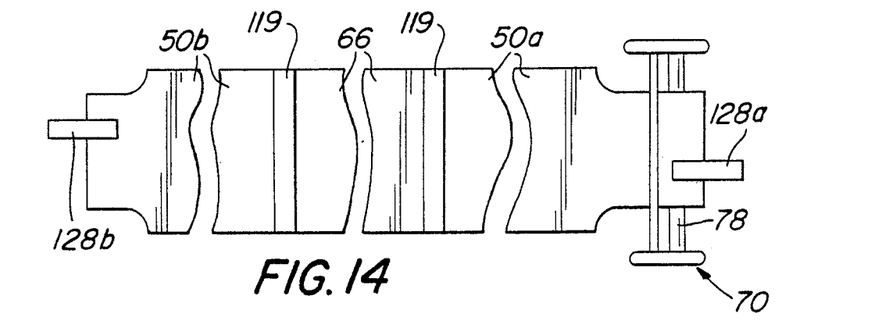
FIG. 14 is a fragmented view of a strip film assembled according to the invention with leaders at each end and with one end extended into a camera film feed spool.

A camera-ready film and leader assembly produced according to the foregoing procedure, but unrolled from camera film feed spool 70, is illustrated in FIG. 14. The feed spool leader 50a at spool 70 is spliced to one end of strip film 66 by adhesive tape 119, and take-up spool leader 50b is spliced by tape 119 to the other end.

Figure 15:
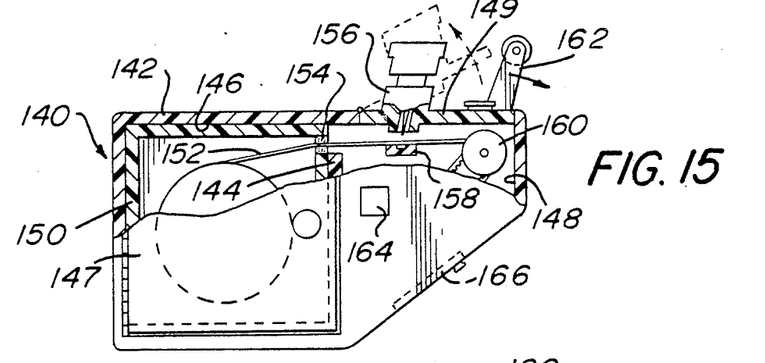
FIG. 15 is a side view, partially in cross section, of another embodiment of a bulk film loader according to the invention for use with a single bulk film cartridge.

Referring now to FIG. 15, there is shown another embodiment of a single bulk film loader 140 according to the invention which is particularly useful for a single type of strip film requiring no leaders, such as 35 mm film. It includes a casing 142 divided by a partition 144 into a film cartridge compartment 146 accessed through a door 147, and a loading compartment 148 accessed through a door 149. Compartment 146 is formed to interface with a rectangular bulk film cartridge 150 through the opening at door 147. A roll of strip film 152 within cartridge 150 is dispensed through a light-tight slot 154, and passes between a guillotine 156 and a grooved beam 158 extending across casing 142 to a camera film feed cassette or spool 160. A crank 162 removably engaged to spool 160 provides for manually reeling the film 152. The number of exposures or frames are counted and indicated at a digital display 164 in the same manner described for bulk film loader 20 of FIG. 1 except there is no requirement for format selector 102 since only one size of film is dispensed. However, selector 102 may be added if different sizes of strip film without leaders is to be accommodated. Batteries, not shown, for energizing the frame counter are contained with compartment 148 and accessed through a door 166.

Figure 16:
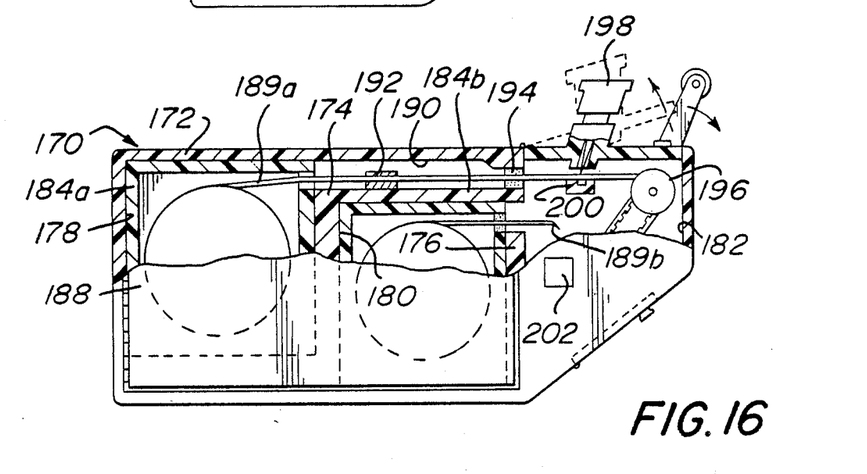
FIG. 16 is a side view, partially in cross section, of still another embodiment of a bulk film loader according to the invention for use with two bulk film cartridges.

FIG. 16 illustrates still another embodiment of a bulk film loader 170 according to the invention which is particularly useful for dispensing two strip films of the same size but of different types such as color and ASA rating. It includes a casing 172 with dividers 174 and 176 forming two bulk film compartments 178 and 180 accessed through a single door 175, and a loading compartment 182. Rectangular light-tight bulk film cartridges 184a and 184b are identical to each other and slidably interface with compartments 178 and 180 and are held in place by a single door 188 when fully closed. Strip film 189a, from a roll in cartridge 184a is fed through a passageway 190 and a light-tight slot 194 into loading compartment 182 by a transport mechanism 192, constructed in the manner described for mechanism 56 of loader 20 of FIG. 1. The strip film 189b in cartridge 184b is also fed into compartment 182. The user may select either bulk film for winding on a cassette or spool 196 by feeding it between a guillotine 198 and a grooved beam 200 onto spool 196. The number of exposures of film are indicated at a digital display 202 in the manner described above for loader 20 of FIG. 1 except for the absence of a format selector since there is only one size of film dispensed. Of course, it is understood that a leader strip cartridge, like cartridge 46 in the embodiment of FIG. 1, could replace film cartridge 184a, or a format selector may be included where different sizes of film without leaders are to be accommodated.

Some of the many novel features and advantages of the invention should now be readily apparent. For example, a photographic bulk film loader of one embodiment is provided which enables loading a camera film feed spool or cassette from one of many different sizes and types of bulk film under daylight conditions. The bulk film cartridges of different types of film can be conveniently substituted in a single loader in daylight without the need of a darkroom or changing bag. The photographer is given much greater flexibility to choose the desired film type to be loaded on a camera film feed spool or cassette, and choose any selected number of exposures of different film formats which are capable of being wound on the spool and automatically measured and indicated. The loader also enables the user to splice leaders to the ends of the strip film during the loading process under daylight conditions. A unique arrangement of bulk leaders in strip form is provided which is readily adaptable to a bulk film loader and includes all of the materials necessary for splicing them at the ends of a measured quantity of film. It is also apparent that the loader and the bulk film and leader cartridges are constructed of relatively inexpensive materials in configurations which are amenable to cardboard or plastic molding, and which are relatively simple to manufacture and assemble.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:
1. Apparatus for daylight loading bulk photosensitive film of different format sizes on a camera film feed spool, the film being supplied in bulk form from a rolled strip within a rectangular cartridge and dispensable through a slot in one side of the cartridge, comprising, in combination:
 a casing partitioned by a divider to form a film compartment and a loading compartment, said film compartment being formed of interface slidably with the cartridge, said loading compartment being formed to support axially the spool, and a passageway in said divider at the cartridge slot for admitting the film into said loading compartment;
 drive means rotatably mounted in said casing and extending into said loading compartment for removably coupling to the spool and winding the film thereon;
 selector means mounted on said casing for producing an output indicative of a manually selected format size for loading on the spool; and
 computer means operatively connected to said drive means and said selector means for multiplying the number of revolutions of said drive means by the selector means output and producing an output indicative of the product thereof and of the number of frames of the selected size wound on said spool.

2. Apparatus according to claim 1 further comprising:
 guillotine means mounted in said casing for cutting a selected length of wound film from the film remaining in the cartridge.

3. Apparatus according to claim 2 wherein:
 said guillotine means includes a blade having a cutting edge movable through the plane of the film in said loading compartment, and a bar disposed opposite of said cutting edge for providing a shear surface therefor.

4. Apparatus according to claim 3 wherein:
 said bar includes a notch for receiving said blade when said blade is moved through said film plane; and
 said blade is inclined for progressively moving the cutting edge across the film into said notch.

5. Apparatus according to claim 2 wherein:
 said guillotine means further includes spring means connected between said casing and said blade for urging said cutting edge out of said film plane.

6. Apparatus according to claim 2 wherein:
 said casing includes a door for providing access to said loading compartment and support for said guillotine.

7. Apparatus according to claim 1 wherein:
 said computer means includes a digital display of said signal.

8. Apparatus according to claim 1 wherein:
 said casing includes a door for providing access to said loading compartment; and
 said computer means includes reset means responsive to opening of said door for nulling computer output.

9. Apparatus according to claim 1 wherein:
 said computer means includes a leaf spring fixed at one end to said casing; and
 pin means operatively connected to said crank means for momentarily deflecting said spring at selected angular intervals of rotation of said crank means to produce an audible sound.

10. Apparatus for daylight loading of bulk photosensitive film on a camera film feed spool, the film being supplied in bulk form from a rolled strip within a first rectangular cartridge, and film or leaders being supplied in bulk form from a rolled strip within a second rectangular cartridge, and dispensable through a slot in one side of each cartridge, comprising, in combination:

a casing partitioned by dividers to form first and second cartridge compartments separated by first and second passageways from a loading compartment aligned in series therewith, said cartridge compartments being formed to interface slidably with respective ones of the cartridges, said loading compartment being formed to support axially the spool, said passageway communicating with the cartridge slots for admitting the film or leaders into said loading compartment; and drive means rotatably mounted in said casing and extending into said loading compartment for removably coupling to the spool and winding the film or leaders thereon.

11. Apparatus according to claim 10 further comprising:

transport means slidable along said second passageway for transferring the film or leaders from the second cartridge into said loading compartment.

12. Apparatus according to claim 11 wherein:

said transport means includes a bifurcated leaf spring formed to straddle the film with the joined distal ends slidably connected to opposite sides of said casing.

13. Apparatus according to claim 12 wherein:

said transport means includes finger grips formed on said distal ends for frictionally engaging the film or leaders therebetween.

14. Apparatus according to claim 10 further comprising:

guillotine means mounted in said casing for cutting a selected length of wound film from the film remaining in either of the cartridges.

15. Apparatus according to claim 14 wherein:

said guillotine means includes a blade having a cutting edge movable through the plane of the film in said loading compartment, and a bar disposed opposite of said cutting edge for providing a shear surface therefor.

16. Apparatus according to claim 15 wherein:

said bar includes a notch for receiving said blade when said blade is moved through said film plane; and said blade is inclined for progressively moving the cutting edge across the film into said notch.

17. Apparatus according to claim 14 wherein:

said guillotine means further includes spring means connected between said casing and said blade for urging said cutting edge out of said film plane.

18. Apparatus according to claim 14 wherein:

said casing includes a door for providing access to said loading compartment and support for said guillotine.

19. Apparatus according to claim 10 further comprising:

counter means operatively connected to said drive means for indicating the number of exposures of film wound on the spool.

20. Apparatus according to claim 19 wherein said counter means includes a computer connected to said drive means for converting the angular rotation thereof to an output signal indicative of the number of exposures of a selected film format.

21. Apparatus according to claim 20 wherein:

said counter means includes a digital display of said signal.

22. Apparatus according to claim 20 wherein:

said casing includes a door for providing access to said loading compartment; and said counter means includes reset means responsive to opening of said door for nulling said output signal.

23. Apparatus according to claim 19 wherein:

said counter means includes a leaf spring fixed at one end to said casing; and pin means operatively connected to said drive means for momentarily deflecting said spring at selected angular intervals of rotation of said drive means to produce an audible sound.

24. Apparatus for daylight loading of bulk photosensitive film with leaders on a camera film feed spool, the film and leaders being supplied in bulk form from rolled strips within respective rectangular cartridges and dispensable through a slot in one side of each cartridge, comprising, in combination:

a casing partitioned by dividers to form a leader compartment, a film compartment, and a loading compartment respectively aligned in series, said film and leader compartments being formed to interface slidably with the respective film and leader cartridges, said loading compartment being formed to support axially the spool, and a passageway in said dividers at the cartridge slots for admitting the film and leaders into said loading compartment; and drive means rotatably mounted in said casing and extending into said loading compartment for removably coupling to the spool and winding the film thereon.

25. Apparatus according to claim 24 further comprising:

transport means slidable along said passageway for transferring the leaders from the leader cartridge into said loading compartment.

26. Apparatus according to claim 25 wherein:

said transport means includes a bifurcated leaf spring formed to straddle the leaders with the joined distal ends slidably connected to opposite sides of said casing.

27. Apparatus according to claim 26 wherein:

said transport means includes finger grips formed on said distal ends for frictionally engaging the leaders therebetween.

28. Apparatus according to claim 24 further comprising:

guillotine means mounted in said casing for cutting a selected length of wound film from the film remaining in the film cartridge.

29. Apparatus according to claim 28 wherein:

said guillotine means includes a blade having a cutting edge movable through the plane of the film in said loading compartment, and a bar disposed opposite of said cutting edge for providing a shear surface therefor.

30. Apparatus according to claim 29 wherein:

said bar includes a notch for receiving said blade when said blade is moved through said film plane; and said blade is inclined for progressively moving the cutting edge across the film into said notch.

31. Apparatus according to claim 28 wherein:

said guillotine means further includes spring means connected between said casing and said blade for urging said cutting edge out of said film plane.

32. Apparatus according to claim 28 wherein:

said casing includes a door for providing access to said loading compartment and support for said guillotine.

33. Apparatus according to claim 24 further comprising:
counter means operatively connected to said drive means for indicating the number of exposures of film wound on the spool.

34. Apparatus according to claim 33 wherein:
said counter means includes a computer connected to said drive means for converting the angular rotation thereof to an output signal indicative of the number of exposures of a selected film size.

35. Apparatus according to claim 34 wherein:
said counter means includes a digital display of said signal.

36. Apparatus according to claim 34 wherein:
said casing includes a door for providing access to said loading compartment; and
said counter means includes reset means responsive to opening of said door for nulling said output signal.

37. Apparatus according to claim 34 wherein:
said counter means includes a format selector for modifying said output signal as a function of the size of the image frame or negative along the length of the film strip.

38. Apparatus according to claim 33 wherein:
said counter means includes a leaf spring fixed at one end to said casing; and
pin means operatively connected to said drive means for momentarily deflecting said spring at selected angular intervals of rotation of said drive means to produce an audible sound.

39. Apparatus for loading strip material on a spool, the material being supplied in bulk rolls from first and second cartridges and dispensable through a slot in one side of each cartridge, comprising, in combination:
a casing partitioned by dividers to form first and second cartridge compartments separated by first and second passageways from a loading compartment aligned in series therewith, said cartridge compartments being formed to interface slidably with respective ones of the cartridges, said loading compartment being formed to support axially the spool, said passageways communicating with the cartridge slots for admitting strip material from a selected one of the cartridges into said loading compartment; and
drive means rotatably mounted in said casing and extending into said loading compartment for removably coupling to the spool and winding the strip material from said selected one of the cartridges thereon.

40. Apparatus according to claim 39 further comprising:
transport means slidable along said passageway for transferring the strip material from the second cartridge into said loading compartment.

41. Apparatus for loading strip material with leaders on a spool, the material and leaders being supplied in bulk rolls within respective cartridges and dispensable through a slot in one side of each cartridge, comprising, in combination:
a casing partitioned by dividers to form a leader compartment, a strip material compartment, and a loading compartment respectively aligned in series, said strip material and leader compartments being formed to interface slidably with the respective strip material and leader cartridges, said loading compartment being formed to support axially the spool, and a passageway in said dividers at the cartridge slots for admitting the strip material and leaders into said loading compartment; and
drive means rotatably mounted in said casing and extending into said loading compartment for removably coupling to the spool and winding the strip material and leaders thereon.

42. Apparatus according to claim 41 further comprising:
transport means slidable along said passageway for transferring the leaders from the leader cartridge into said loading compartment.

* * * * *